United States Patent Office 2,976,790
Patented Mar. 28, 1961

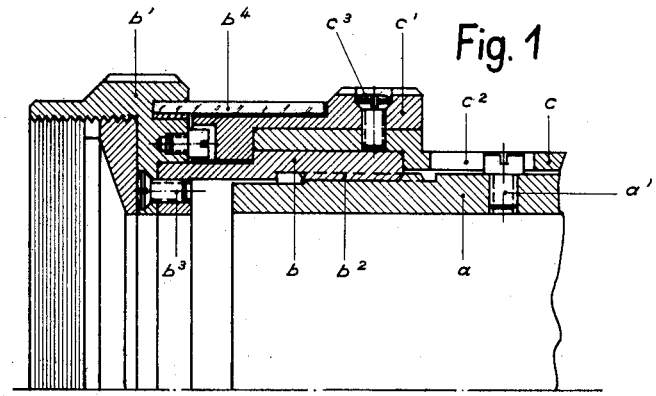
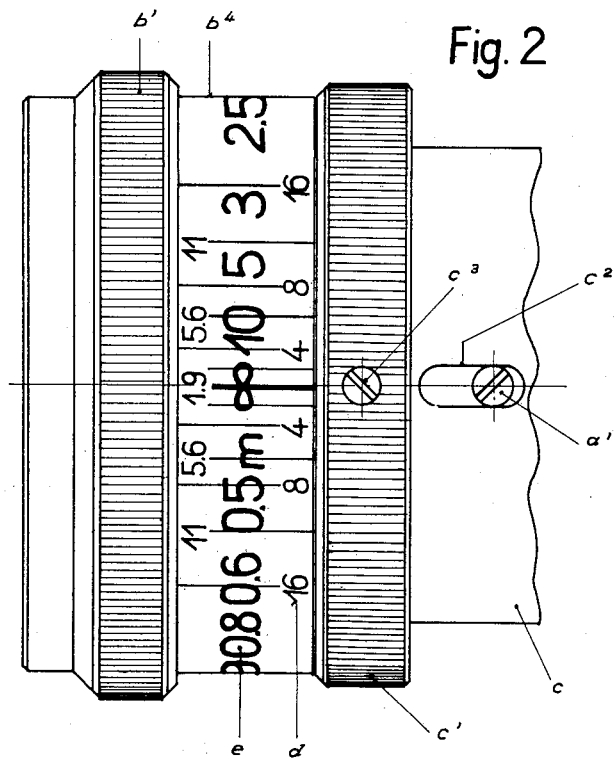

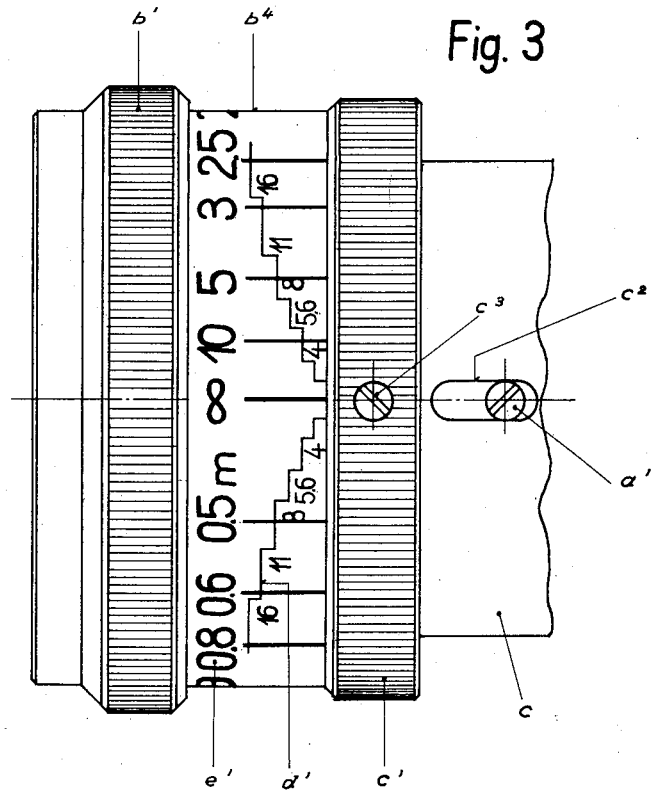

2,976,790
PHOTOGRAPHIC OR CINEMATOGRAPHIC LENS MOUNT

Waldemar Ewald, Kreuznach, Rhineland, Germany, assignor to Jos. Schneider & Co., Optische Werke, Kreuznach, Rhineland, Germany, a corporation of Germany Filed May 8, 1958, Ser. No. 733,957

Claims priority, application Germany May 29, 1957

4 Claims. (Cl. 95—45)

My present invention relates to a lens mount forming part of a photographic or cinematographic objective having means for indicating the depth of field in different focusing positions.

In conventional objectives of this type, the rotatable mount for the front lens carries the usual distance scale while an adjacent stationary portion of the objective housing is provided with markings indicating the depth of field. This type of arrangement requires considerable space on the relatively rotatable housing portions if the distance and depth-of-field indications are to be engraved thereon with a sufficient degree of legibility.

The general object of this invention is to provide an improved objective housing in which the required information is contained on a relatively small area so that a more compact structure and/or enhanced legibility is obtained.

A more specific object is the provision of means for so displaying the aforementioned indications as to make the correlation between depth of field, as read on the distance scale, and relative aperture of the objective more readily apparent.

The above objects are realized, in accordance with this invention, by the provision of a focusing ring which is rotatably mounted on the objective housing and carries a light-transmissive element provided with a first set of markings, this element overlying an annular zone of a non-rotatable housing portion bearing a second set of markings which register with the first-mentioned markings to give the desired distance and depth-of-field indications. Preferably, the light-transmissive element is of annular configuration and the non-rotatable housing portion is an extension of the usual lens barrel slidably mounted thereon for axial entrainment by the focusing ring.

The invention will be described in greater detail with reference to the accompanying drawing in which:

Fig. 1 is a fragmentary axial section of the forward part of an objective housing representing a lens mount according to the invention;

Fig. 2 is a top plan view of the lens mount of Fig. 1; and

Fig. 3 is a view similar to Fig. 2, showing a modification.

The objective housing shown in Figs. 1, 2 and 3 comprises a lens barrel $a$ which supports the stationary components of a photographic or cinematographic objective not shown. A cylinder $b$, matingly engaging the barrel $a$ through screw threads $b^2$, is rigidly connected by means of screws $b^3$ with a focusing ring $b'$ which also serves as a support for the movable front component, not shown, of the objective.

A tubular housing portion $c$ has a slot $c^2$ into which extends the head of a screw $a'$ lodged in lens barrel $a$. By this means the tube $c$ is prevented from rotating relatively to barrel $a$ while being axially slidable with respect thereto, such sliding movement being brought about by the interengagement of a shoulder on cylinder $b$ with a depth-of-field ring $c'$ which is fastened onto tube $c$ by screws $c^3$.

A sleeve $b^4$ of transparent or highly translucent material, rigidly connected with focusing ring $b'$, registers with an annular zone of ring $c'$ so that the markings of a distance scale on the former co-operate with the markings of a depth-of-field scale on the latter. As shown in Fig. 2, the distance scale $e$ may be centrally positioned on the visible portion of sleeve $b^4$ while the depth-of-field markings $d$ on ring $c$, representing the various numerical values of relative apertures to which the objective may be adjusted by the usual diaphragm control not shown, are alternately placed on axially opposite sides of scale $e$. As illustrated in Fig. 3, a distance scale $e'$ on sleeve $b^4$ may also co-operate with a stepped scale $d'$ on ring $c'$ on which the proximal and distal limits of the depth-of-field range can be read even more conveniently as the values of scale $e'$ registering with the values (e.g. 11, 11 or 16, 16) on scale $d'$ corresponding to a particular diaphragm setting.

It will be understood that the scales $d$, $e$ or $d'$, $e'$ may have their markings in contrasting colors and that various modifications of the arrangements specifically described and illustrated will be possible without departing from the spirit and scope of the invention as defined in the appended claims.

I claim:

1. A lens mount for an optical objective, comprising a lens barrel, a tubular element non-rotatably connected with said barrel, a focusing ring rotatably connected with said barrel in a fixed axial position relative to said element, and a light-transmissive member secured to said ring for rotation therewith, said member overlying at least part of an annular zone of said element and bearing a first set of angularly spaced markings, said annular zone bearing a second set of angularly spaced markings registering with said first set of markings, the markings of one set constituting a distance scale, the markings of the other set constituting a scale of relative apertures duplicated on opposite sides of a reference point and co-operating with said distance scale in indicating depth of field between like markings of said other set.

2. A lens mount according to claim 1 wherein said focusing ring and said lens barrel are provided with matingly engaged screw threads, said element being slidably secured to said barrel and linked with said focusing ring for axial entrainment thereby.

3. A lens mount according to claim 1 wherein said member is in the form of a sleeve coaxially surrounding said element.

4. A lens mount according to claim 1 wherein said scale of relative apertures is of stepped configuration with steps of like height bearing identical markings.

References Cited in the file of this patent

UNITED STATES PATENTS

| | | |
|---|---|---|
| 2,305,294 | Kuppenbender | Dec. 15, 1942 |
| 2,315,977 | Mihalyi | Apr. 6, 1943 |

FOREIGN PATENTS

| | | |
|---|---|---|
| 914,511 | France | Oct. 10, 1946 |
| 1,160,226 | France | Feb. 24, 1958 |

(Corresponding U.S. Patent 2,916,981, Dec. 13, 1959)